(12) United States Patent
Obradovic et al.

(10) Patent No.: US 8,913,633 B2
(45) Date of Patent: Dec. 16, 2014

(54) SYSTEM AND METHOD FOR TIME SYNCHRONIZATION IN A COMMUNICATION NETWORK

(75) Inventors: Dragan Obradovic, Ottobrunn (DE); Ruxandra Scheiterer, Geretsried (DE); Günter Steindl, Poppenricht (DE); Philipp Wolfrum, München (DE)

(73) Assignee: Siemens Aktiengesellschaft, Munich (DE)

( * ) Notice: Subject to any disclaimer, the term of this patent is extended or adjusted under 35 U.S.C. 154(b) by 240 days.

(21) Appl. No.: 13/216,831

(22) Filed: Aug. 24, 2011

(65) Prior Publication Data

US 2012/0051374 A1    Mar. 1, 2012

(30) Foreign Application Priority Data

Aug. 24, 2010 (EP) .................................... 10173897

(51) Int. Cl.
*H04L 7/00* (2006.01)
*H04J 3/06* (2006.01)
*H04L 7/08* (2006.01)

(52) U.S. Cl.
CPC ............ *H04J 3/0697* (2013.01); *H04J 3/0682* (2013.01); *H04L 7/08* (2013.01); *H04J 3/0664* (2013.01)
USPC ........... 370/503; 370/504; 370/505; 370/508; 370/511

(58) Field of Classification Search
CPC .......... H04W 56/001; H04W 56/0015; H04W 74/06; H04W 74/0816; H04J 3/0664; H04J 3/0697; H04J 3/0682
USPC ......... 370/503–505, 508–511, 389, 392, 401, 370/252; 375/356–358, 371
See application file for complete search history.

(56) References Cited

U.S. PATENT DOCUMENTS

| 7,720,105 B2 * | 5/2010 | Colmant et al. ............... 370/503 |
| 8,089,982 B1 * | 1/2012 | Vleugels et al. .............. 370/447 |
| 8,189,624 B2 * | 5/2012 | Sakurada et al. ............. 370/503 |
| 8,275,087 B2 * | 9/2012 | Hadzic et al. ................. 375/376 |

(Continued)

OTHER PUBLICATIONS

Scheiterer et al., "Synchronization Performance of the Precision Time Protocol in Industrial Automation Networks", IEEE Transactions on Instrumentation and Measurement, vol. 58, No. 6, Jun. 2009, pp. 1849-1857.

(Continued)

*Primary Examiner* — Dang Ton
*Assistant Examiner* — Sai Aung
(74) *Attorney, Agent, or Firm* — Cozen O'Connor (57) ABSTRACT

A system and method for time synchronization in a communication network. The communication network includes a plurality of network nodes each having a respective internal clock, and a reference node having a reference clock and each configured transmits synchronization messages within the communication network. At least one network node is configured to determine an estimated reference clock time discretely upon arrival of a synchronization message at the at least one network node. To that end, the at least one network node includes a controller for determining a controlled time comprising a time-continuous estimate of the discretely estimated reference clock time. The controller is configured to determine the controlled time based on an input that is extrapolated to an execution time instant of the controller, where the execution time instant is separated from the time instant of arrival of the synchronization message by a delay ($\Delta t_{delay}$).

18 Claims, 4 Drawing Sheets

(56) References Cited

U.S. PATENT DOCUMENTS

| | | | |
|---|---|---|---|
| 8,281,177 B2* | 10/2012 | Yajima et al. | 713/400 |
| 2002/0061083 A1 | 5/2002 | Kaesdorf et al. | |
| 2007/0297457 A1 | 12/2007 | Bonnifait et al. | |
| 2009/0086766 A1* | 4/2009 | Gotz et al. | 370/503 |
| 2009/0222608 A1* | 9/2009 | Schott | 710/301 |
| 2010/0098111 A1* | 4/2010 | Sun et al. | 370/509 |
| 2010/0158051 A1* | 6/2010 | Hadzic et al. | 370/503 |
| 2011/0264396 A1* | 10/2011 | Kitchener et al. | 702/117 |

OTHER PUBLICATIONS

Ridoux et al., "Ten Microseconds Over LAN, for Free (Extended)", IEEE Transactions on Instrumentation and Measurement, vol. 58, No. 6, Jun. 2009, pp. 1841-1848.

Calder et al., "Ultraprecise Absolute Time Synchronization for Distributed Acquisition Systems", IEEE Journal of Oceanic Engineering, vol. 32, HNo. 4, Oct. 2007, pp. 772-785.

Rosselot, "Simple, Accurate Time Synchronization in an Ethernet Physical Layer Device", Information Sciences and Systems, 2007, Oct. 2007, p. 5.

* cited by examiner

SYSTEM AND METHOD FOR TIME SYNCHRONIZATION IN A COMMUNICATION NETWORK

BACKGROUND OF THE INVENTION

1. Field of the Invention

The present invention relates to data communications and, more particularly, a system and method for time synchronization in a communication network.

2. Description of the Related Art

Communication networks are used in a very wide range of areas to control work sequences in a decentralized manner. In particular, in industrial automation systems, it is particularly important for the automatic work processes to be coordinated with one another. This is achieved by providing the individual communicating network nodes in the communication network with internal clocks, where synchronization messages are transmitted to synchronize all the internal clocks. The internal clock of a respective network node hereby operates at a corresponding node clock frequency which may, in some instances, be different for the individual network nodes. The clocks are synchronized based on a predefined synchronization clock frequency, where the synchronization messages is transmitted as a function of the synchronization frequency. Consequently, synchronization messages are sent at fixed clock intervals in accordance with the synchronization clock frequency.

The individual synchronization messages transmitted in the communication network contain a pulse counter status of the synchronization clock. Each network node updates this pulse counter status by estimating the number of pulses of the synchronization clock between transmission of the synchronization message at the preceding network node and receipt of the synchronization message at the respective network node. This estimate is generally performed by estimating the pulse ratio (i.e., the Rate Compensation Factor (RCF)) between the reference clock frequency and the node clock frequency of the respective network node. The estimated pulse ratio can then be used to convert the time interval between transmission of a synchronization message at the preceding network node and transmission of the synchronization message at the respective network node, measured in node clock frequency pulses, to synchronization clock frequency pulses. The resulting number of pulses is then added to the pulses of the received synchronization message and a correspondingly updated synchronization message is resent from the corresponding network node. It should be herein noted that the content of a synchronization message can also be represented in time (e.g., nanoseconds), instead of pulses of the synchronization clock. In such a case, the resulting adaptation to the description below should be readily apparent to one skilled in the art.

The use of the PROFINET standard in the field of industrial automation is known, this being an Ethernet which meets industrial requirements. This standard operates in accordance with the principle set out above, according to which the pulse counter statuses in the synchronization messages are updated in the network nodes. PROFINET-based systems generally use the Institute of Electrical and Electronic Engineers (IEEE) standard 1588 to synchronize the internal clocks of the network nodes, where the updating of the pulse counter statuses of the synchronization messages based on the standard is performed in accordance with the principle set out above. According to this standard, synchronization messages are transmitted in succession from one network node to the next in a logical sequence or tree structure. The synchronization messages originate from a master element, which is the first element in the sequence or in the tree structure. The synchronization messages originally contain a time stamp of the counter of a synchronization clock in the master element when a synchronization message was transmitted. The network nodes in the sequence or tree structure act as slave elements that process and forward this information.

An implementation of this standard is described in R. Lupas Scheiterer, C. Na, D. Obradovic and G. Steindl: "Synchronization performance of the Precision Time Protocol in Industrial Automation Networks", ISPCS07 Special Issue of the IEEE Transactions on Instrumentation and Measurement, June 2009, Volume 58, Issue 6, pp. 1849-1857.

As known from the above described state of the art, a slave element adds all the estimated time delays between transmission of a synchronization message from the preceding slave element and its own transmission of the synchronization message. Based on this, each slave element determines its own estimate of current master clock pulse count, which is referred to herein as "reference master time". However, the reference master time, as estimated by a slave element, is noisy due to transmission delays and disturbances to the elements and is further discontinuous because it is estimated only upon arrival of the synchronization message to the slave element. These properties limit the number of elements (nodes) that can be simultaneously synchronized with the required accuracy (a typical standard example is 1 microsecond). Moreover, jumps in the synchronized slave times are not permissible for time critical industrial applications.

SUMMARY OF THE INVENTION

It is therefore an object of the present invention to provide a system and a method for time synchronization in a communication network in which the estimate of the reference clock time at the individual network nodes is improved further.

This and other objects and advantages are achieved by an system and method in accordance with the invention which improves an estimate of a reference clock time at a network node by providing a controller at that node that determines a controlled time that tracks the estimated reference clock time. Unlike the reference clock time that is estimated in a discrete manner upon arrival of a synchronization message to the network node, the controlled time is regulated in a continuous manner and is hence free from jumps. Consequently, the controlled time is better suited for time critical industrial applications.

In addition, the present invention addresses a situation when the controller execution time is delayed with respect to the arrival of a synchronization message, which is often a practical scenario. Here, the controller input becomes outdated and leads to increased synchronization error. In such a case, the input to the controller should ideally correspond to this later time instant to ensure proper operation. However, the controller input cannot be directly obtained at any instant but only at the instant of arrival of the synchronization message. An essential feature of the present invention is to provide for compensation of the controller delay by extrapolating the controller input to the execution time instant of the controller, instead of by calculating the controller input at the time of arrival of the synchronization message. To calculate the controller input in this way requires knowledge of the actual delay incurred by the controller. Extrapolating the input to the controller to the execution time instant improves controller performance, and ensures that synchronization error is not increased as a result of controller execution delay.

The present invention may also be embodied as a computer program product having computer readable program code therein, which is executable by a processor to realize the technical features mentioned above.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is further described hereinafter with reference to illustrated embodiments shown in the accompanying drawings, in which.

DETAILED DESCRIPTION OF THE PREFERRED EMBODIMENTS

The inventive technique proposed herein is preferably deployed in an industrial automation system, in which distributed components of the system communicate with one another, to control manufacturing sequences, e.g., in automobile production. To this end, the individual components communicate with one another wirelessly and/or wired over a communication network. The components thus represent network nodes of the communication network.

Figure 1:
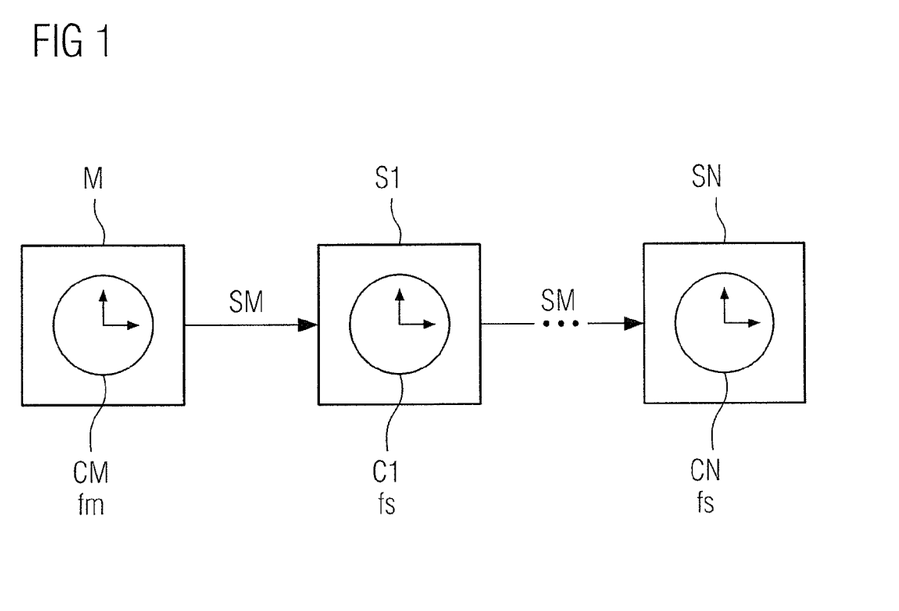
FIG. 1 is a schematic block diagram of a plurality of network nodes in a communication network between which synchronization messages are sent in accordance with the invention.

In the embodiment depicted in FIG. 1, a communication network comprises network nodes embodied, for example, as slave elements S1, ..., SN. Each network node has a corresponding internal clock C1, ..., CN. Each of these clocks operates at a predefined node clock frequency fs which can, in some instances, be different for different network nodes. The communication network also includes a reference node comprising, for example, a master element M, having a synchronization clock CM, which predefines a synchronization clock frequency fm, to which all the internal clocks C1, ..., CN of the network nodes S1, ..., SN are to be set. To achieve this, synchronization messages SM are transmitted at constant time intervals by the reference node M, where the messages each comprise a predefined number of pulses of the synchronization pulse. Each of these synchronization messages contains the pulse counter status of the clock CM, i.e., the pulses of the synchronization pulse that have already expired during operation of the method. This pulse status is transmitted with each synchronization message SM.

The reference node M and the individual network nodes S1 to SN communicate in sequence with one another, where synchronization messages are transmitted from the reference node M to the node S1 and from node S1 to the node S2, etc. to the node SN. To achieve precise synchronization in the individual network nodes, the pulse counter status in the synchronization messages SM must be updated in the individual network nodes. Therefore, the time delay, which is required between transmission of a synchronization message from the preceding network node (or from the reference node) and transmission of the synchronization message from the respective network node to the next network node, is known in each network node. This time delay comprises the time interval $LD_i$ and $BD_i$ (i=1, ..., N), where it is possible for the time interval to be different for each network node. Here, $LD_i$ is the time interval required to transmit the message from the preceding network node Si-1 to the next network node Si (LD=Line Delay). $BD_i$ is the processing time required in a network node Si to process a received synchronization message before transmission of the synchronization message to the next network node (BD=Bridge Delay). This delay time is indicated in the respective network node in pulses according to the network node clock frequency fs.

In order to update the pulse counter status of a received synchronization message SM, it is necessary to estimate the pulse ratio between the synchronization clock frequency fm and the respective network node clock frequency fs in the respective network node. This pulse ratio is also referred to herein as the rate compensation factor (RCF) and in the presently described embodiment is an estimate of the quotient of fm and fs. Multiplying the estimated pulse ratio by the time delay LDi+BDi provides an estimate of the delay incurred in network node i by the previously received synchronization message, expressed as the number of counter pulses of the reference node. This number is added to the pulse counter status of the received synchronization message and a synchronization message with this current pulse counter status is transmitted from the respective network node. The synchronization sequence for the internal clocks is sufficiently known to the person skilled in the art and is therefore not described here in detail.

At least one network node S1, or possibly all nodes S1 to SN, are configured, in a conventional manner, for determining a reference clock-time RMT, which is an estimate of the true clock time CMT of the reference clock CM. In the illustrated embodiment, the estimated reference clock time RMT is represented as a pulse count. It may, however, be understood that the estimated reference clock time RMT may be represented in units of time (for example, nanoseconds), without deviating from the scope of the disclosed embodiments of the invention. In such a case, the resulting adaptation or modification to the below-described embodiments should be readily apparent to one skilled in the art.

Figure 2:
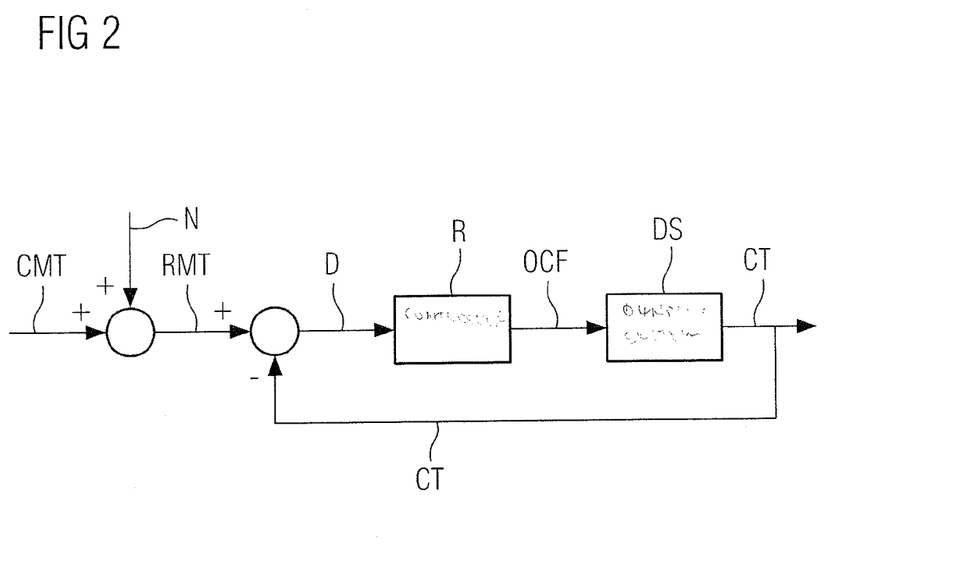
FIG. 2 is a schematic block diagram of an exemplary control circuit for time synchronization in a communications network.

FIG. 2 shows a control circuit for time synchronization in a communication network. The circuit herein is a schematic representation of a rule that is performed by at least one of the nodes S1 to SN, or possibly even by all nodes S1 to SN. As mentioned above, at the respective network node, a reference clock time is estimated upon arrival of a synchronization message to that node, where the estimated reference clock time RMT is a local estimate of the true clock time CMT of the reference clock CM. The estimated reference clock time RMT is influenced by a noise N due to sequential transmission of the synchronization message through the preceding network nodes. The noise N increases with distance from the reference node. Thus, in principle, the estimated reference clock time RMT is noisy and discrete, being available only at the arrival of a synchronization message.

The system and method in accordance with the disclosed embodiments of the invention provides an improvement in the estimation of the reference clock time RMT. The estimated reference clock time RMT is herein used as a set-point (or reference variable) for determining a controlled time CT, which is a time-continuous estimate of the reference clock time RMT. This is accomplished by a controller R provided at the respective network node. The controller R may include any continuous controller, such as a proportional-integral (PI) or a proportional-integral-derivative (PID) controller. This ensures that the controlled time CT is steady and continuous. The input to the controller R is an offset D between the estimated reference clock time RMT and the controlled time CT. The offset is determined in accordance with the relationship:

$$\text{offset}(t) = \text{RMT}(t) - \text{CT}(t) \qquad \text{Eq. 1}$$

The output or control action of the controller R, upon execution of the controller R, is a manipulated variable referred to herein as offset compensation factor OCF. In the case of a PI controller, the offset compensation factor OCF is obtained from the discretized control law as:

$$\text{OCF}_n^i = \text{OCF}_n^{i-1} + (k_p(\text{offset}_n^i - \text{offset}_n^{i-1}) + k_i \text{offset}_n^{i-1}(t(i) - t(i-1)))/f_{nom} \qquad \text{Eq. 2}$$

Other controllers with integral components could also be used.

In the above expression (Eq. 1), $\text{offset}_n^i = \text{RMT}_n^i - \text{CT}_n^i$. $\text{offset}_n^i$ is the deviation of the network node n at time instant t(i). $\text{RMT}_n^i$ represents the reference clock time estimated at network node n at time instant t(i). $\text{CT}_n^i$ represents the controlled time at network node n at time instant t(i). $\text{OCF}_n^i$ represents the offset compensation factor determined by the controller at node n at time instant t(i). In addition, $k_p$ in the above expression denotes the proportional constant and $k_i$ represents the integral constant of the PI controller, while $f_{nom}$ represents the nominal frequency of the internal clock of the respective network node.

The offset compensation factor OCF is thus a measure of the PI controller estimated time-dependent relationship between the clock frequency fm of the reference clock CM and the clock frequency fs of the respective network node (S1 in this example). The output of the controller r (i.e., the offset compensation factor OCF) is provided to a dynamic system DS, which is a virtual clock that calculates the controlled time CT by following the internal clock C1 of the network node S1 and continuously correcting the same using the offset compensation factor as per the following relationship:

$$CT_n^i = CT_n^{i-1} + OCF_n^{i-1}(S_n^i - S_n^{i-1}) \qquad \text{Eq. 3}$$

In the above expression (Eq. 3), $s_n^i$ represents the clock pulse count of the internal clock of the network node n at time instant t(i).

The calculation of the controlled time CT can thus occur in arbitrarily small time intervals, making it a time-continuous function. Since the closed loop in FIG. 2 has no direct feed forward from input to output, jumps in the estimated reference clock time (RMT) will not result in jumps in the controlled time CT. Thus the controlled time CT provides a smooth continuous time that can be used in time-critical applications. The present inventors have determined that controlled time CT provides a better estimate of the true reference clock time CMT in comparison to the estimated reference clock time RMT, the advantage becoming more pronounced with rising distance from the reference node. In an exemplary network with 160 nodes examined, which were arranged in a line topology, a reduction of 18-35% of the maximum error was achieved.

Thus, an offset compensation OCF factor determined by the controller R forms a gradient of the controlled time CT with respect to local internal clock time. This will ensure that the controlled time CT tracks the estimated reference clock time RMT without any jumps.

As noted above, the reference clock time RMT is estimated at a network node only at the arrival of a synchronization message to the respective network node. Accordingly, offset D that is input to the controller R is available only at the time instant of arrival of a synchronization message. This requires the controller R to be executed exactly at the time instant of arrival of a synchronization message. However, if the execution of the controller R is delayed, the input (i.e., offset D) is outdated and results in increased synchronization error. Hence, if the controller execution is delayed by an interval $\Delta t_{delay}$ (measured in local time of the respective node), the offset D should also be calculated at this later time instant to ensure proper operation. However, the offset D cannot be directly obtained for this delayed time instant since the estimated reference clock time RMT is not known for this time instant. In accordance with the disclosed embodiments, an execution delay compensation is provided which involves extrapolation of the offset D to the execution time instant of the controller R. This is achieved by extrapolating the estimated reference clock time RMT and the controlled time CT to the execution time instant of the controller R. In the illustrated embodiment, this extrapolation is performed based on the slope of the estimated reference clock time RMT (i.e., an extrapolation of RMT) and that of the controlled time CT with respect to the local time of the network node. The slope of the estimated reference clock time RMT with respect to the local time of the network node is the rate compensation factor (RCF), which is the pulse ratio between the reference clock frequency and the node clock frequency of the respective network node, locally estimated at the respective network node upon arrival of a synchronization message. The slope of the controlled time with respect to the local time of the network node is the controller estimated offset compensation factor (OCF) that is known from the immediately previous execution of the controller R. The calculation of the offset compensation has been explained above.

Based on the knowledge of the aforementioned slopes, the offset D, as extrapolated to the execution time instant of the controller R, may be determined in accordance with the following relationship:

$$\text{offset}(t^i + \Delta t_{delay}) = \text{offset}^i + (RCF^i - OCF^{i-1})\Delta t_{delay} \qquad \text{Eq. 4}$$

In the above expression (Eq. 4), $t^i$ denotes the time instant of arrival of the synchronization message, $\Delta t_{delay}$ denotes the execution delay of the controller with respect to the arrival of the synchronization message, $\text{offset}(t^i + \Delta t_{delay})$ denotes the offset extrapolated to the execution time instant of the controller, $\text{offset}^i$ denotes the offset calculated at the arrival of the synchronization message, $RCF^i$ denotes the rate compensation factor estimated upon arrival of the synchronization message and $OCF^{i-1}$ denotes the offset compensation factor calculated at an immediately previous execution of the controller.

Using the extrapolated offset as calculated above as the input D, the offset compensation factor OCF is determined at the execution time instant of the controller R. Using such an extrapolated input controller improves controller performance, and ensures that that synchronization error is not increased as a result of controller execution delay. However, knowledge of the actual delay incurred by the controller is required to calculate the offset in this way.

The proposed system and method thus provides an improved rule for calculating the controller input in case of an execution delay, which provides a reduction or error in estimating the true reference clock time compared to when no delay compensation is provided.

Figure 3:
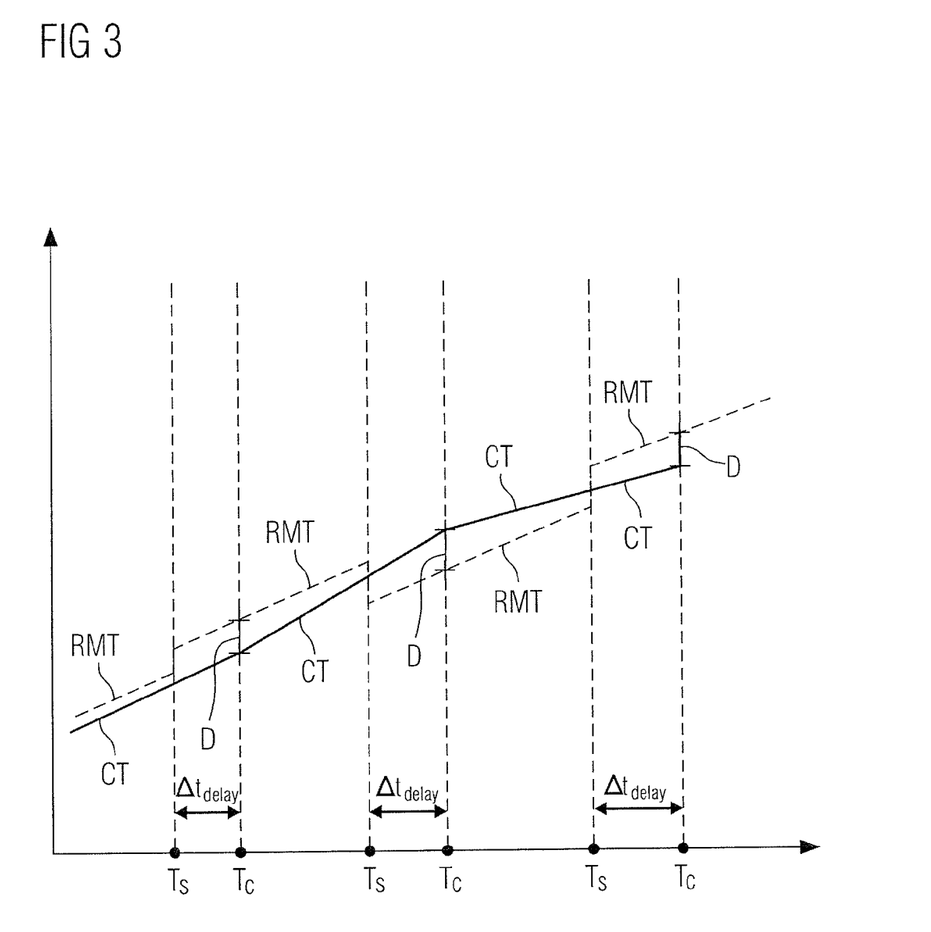
FIG. 3 is a graphical plot illustrating a comparison of an estimated reference clock time (RMT) and a controlled time (CT) when controller execution is delayed.

FIG. 3 is an exemplary graphical plot that illustrates a comparison of the estimated reference clock time RMT and the controlled CT when the controller execution is delayed. In FIG. 3, the abscissa represents absolute time, where the time instants $T_s$ represent arrival time instants of a synchronization message, while the time instants $T_c$ represent actual execution time instants of the controller, which are separated by a delay interval $\Delta t_{delay}$ with respect to the time instants $T_s$. The ordinate represents respective estimated reference clock time RMT and the controlled time CT as applicable.

In FIG. 3, the plot of the estimated reference clock time RMT is shown by dashed lines since it is only estimated at time instants $T_s$ when the synchronization messages arrive. The dashed lines show a possible linear extrapolation of the estimated reference clock time RMT between synchronization intervals, based on the value of the slope (i.e., the rate compensation factor) that is estimated at the time instants $T_s$ when the synchronization messages arrive. It can be noted that the estimated reference clock time RMT is discontinuous and piece-wise linear even upon extrapolation between synchronization intervals, as it is recalculated for each time instant $T_S$ when a synchronization messages arrives. The plot of the controlled time CT is shown as a bold line. As shown, the controlled time CT is time-continuous, in which the slope is given by the offset compensation factor (OCF) calculated by the controller R. Since the controller execution is delayed with respect to the time instant $T_s$ of arrival of the synchronization messages, the offset D is not determined at these time instants $T_s$, but instead determined at time $T_C$ when the execution of the controller R occurs. Using the extrapolated offset D as input, the controller R determines the offset compensation factor OCF at these time instants $T_C$ based on which the controlled time CT is regulated continuously, to track the estimated reference clock time RMT. As can be seen, the controlled time as determined herein is time-continuous and has a steady course, which is advantageous for time-critical applications.

In the above-described embodiments, the controller R may be incorporated, for example, in a network card having its own real-time clock and time stamp unit. Further, the controller R may be a digital controller implemented in software, or alternately implemented in hardware.

In a further embodiment, the time synchronization is performed in accordance with the International Electro-Technical Commission (IEC) standard 61158 Type 10, also called PROFINET, and/or Precision Transparent Clock Protocol in accordance with the IEC standard 61158 Type 10. Herein, the reference node M functions as a master element and the network nodes S1, . . . , SN function as slave elements under the respective standards used. In a further preferred embodiment, the communications network comprises a multicast network, in particular an Ethernet.

Figure 4:
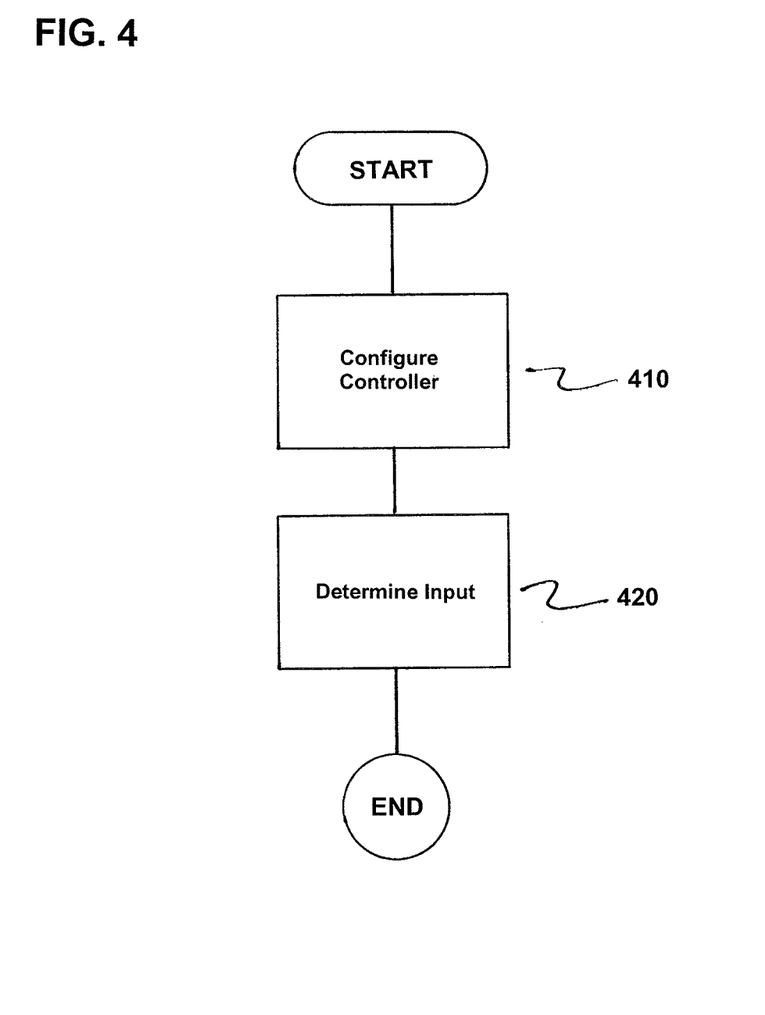
FIG. 4 is a flow chart of the method in accordance with an embodiment of the invention.

FIG. 4 is a flowchart of a method for time synchronization in a communication network, where the communication network comprises a plurality of network nodes each having a respective internal clock, and a reference node having a reference clock and is configured for transmitting synchronization messages within the communication network, and where at least one network node is configured to determine an estimated reference clock time discretely upon arrival of a synchronization message at the at least one network node. The method comprises configuring, for the at least one network node, a controller for determining a controlled time comprising a time-continuous estimate of the discretely estimated reference clock time based on an input extrapolated to an execution time instant of the controller, as indicated in step 410. Here, the execution time instant is separated from an arrival time instant of the synchronization message by a delay.

The input is then determined as an offset between the discretely estimated reference clock time and the controlled time, extrapolated to the execution time instant, as indicated in step 420.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A system for time synchronization in a communication network, the communication network comprising:
   a plurality of network nodes each having a respective internal clock; and
   a reference node having a reference clock and configured to transmit synchronization messages within the communication network, the reference node and each of the plurality of network nodes communicating sequentially with each other;
   wherein at least one network node of the plurality of network nodes is configured to determine an estimated reference clock time discretely upon arrival of a synchronization message at the at least one network node;
   wherein each of the plurality of network nodes includes a controller configured to determine a controlled time comprising a time-continuous estimate of the discretely estimated reference clock time, the controller being configured to determine the controlled time based on an input that is extrapolated to an execution time instant of the controller, the extrapolation being performed based on a slope of the estimated reference clock time and a slope of the controlled time with respect to an internal clock time of the at least one network node, and the execution time instant being separated from an arrival time instant of the synchronization message by a delay ($\Delta$tdelay).

2. The system according to claim 1, wherein the controller is one of a proportional-integral controller and a proportional-integral-derivative controller.

3. The system according to claim 1, wherein the input to the controller is an offset between the discretely estimated reference clock time and the controlled time, extrapolated to the execution time instant.

4. The system according to claim 3, wherein an output of the controller is a manipulated variable comprising an offset correction factor forming a controller estimated measure of a time-dependent ratio of a frequency of the reference clock and a node clock frequency of the respective internal clock of the at least one network node, wherein the controlled time is continuously regulated by correcting the internal clock time of the at least one network node based on the offset correction factor.

5. The system according to claim 4, wherein an offset between the estimated reference clock time and the controlled time is extrapolated to the execution time instant based on a ratio of a reference clock frequency and a node clock frequency locally estimated at the at least one network node upon arrival of the synchronization message at the at least one network node, and an offset correction factor estimated at a previous execution of the controller.

6. The system according to claim 1, wherein the controller is incorporated in a network card having a real-time clock and a time stamp unit.

7. The system according to claim 1, wherein the time synchronization is performed in accordance with Industrial Electrotechnical Commisison (IEC) standard 61158 Type 10, wherein the reference node functions as a master element and each of the plurality of network nodes function as slave elements under a respective implemented standard, and wherein the communications network comprises a multicast network.

8. The system according to claim 7, wherein the IEC standard 61158 Type 10 is at least one of PROFINET and Precision Transparent Clock Protocol.

9. The system according to claim 7, wherein the multicast network comprises an Ethernet.

10. A method for time synchronization in a communication network, the communication network comprising a plurality of network nodes each having a respective internal clock, and a reference node having a reference clock and configured for transmitting synchronization messages within the communication network, at least one network node being configured to determine an estimated reference clock time discretely upon arrival of a synchronization message at the at least one network node, the method comprising:
configuring, for the at least one network node, a controller for determining a controlled time comprising a time-continuous estimate of the discretely estimated reference clock time based on an input extrapolated to an execution time instant of the controller, the extrapolation being performed based on a slope of the estimated reference clock time and a slope of the controlled time with respect to an internal clock time of the at least one network node, the execution time instant being separated from an arrival time instant of the synchronization message by a delay ($\Delta$tdelay); and
determining the input as an offset between the discretely estimated reference clock time and the controlled time, extrapolated to said execution time instant;
wherein the reference node and each of the plurality of network nodes communicating sequentially with each other.

11. The method according to claim 10, further comprising:
configuring the controller for determining a manipulated variable based on the input, the manipulated variable being an offset correction factor comprising a controller estimated measure of a time-dependent ratio of a frequency of the reference clock and a node clock frequency of the internal clock of the at least one network node; and
continuously regulating the controlled time by correcting the internal clock time of the network node based on the offset correction factor.

12. The method according to claim 11, further comprising: extrapolating an offset between the estimated reference clock time and the controlled time to the execution time instant based on a ratio of a reference clock frequency and the node clock frequency locally estimated at said network node upon arrival of the synchronization message, and an offset correction factor estimated at a previous execution of the controller.

13. The method according to claim 10, wherein the time synchronization is performed in accordance with Industrial Electrotechnical Commission (IEC) standard 61158 Type 10, wherein the reference node (M) functions as a master element and each of the plurality of network nodes function as slave elements under a respective implemented standards, and wherein the communications network comprises a multicast network.

14. The method according to claim 13, wherein the multicast network comprises an Ethernet.

15. The method according to claim 11, wherein the controller is at least one of a proportional-integral controller and proportional-integral-derivative controller, and wherein the controller is a digital controller implemented in software.

16. A network node included in a system for time synchronization in a communication network, the network node comprising:
an internal clock; and
a controller configured to determine a controlled time comprising a time-continuous estimate of an estimated reference clock time, the controller being configured to determine the controlled time based on an input which is extrapolated to an execution time instant of the controller, the extrapolation being performed based on a slope of the estimated reference clock time and a slope of the controlled time with respect to an internal clock time of the at least one network node, and the execution time instant being separated from an arrival time instant of the synchronization message by a delay ($\Delta$tdelay);
wherein the network node is configured to determine the estimated reference clock time discretely upon arrival of the synchronization message and configured to communicate sequentially with other nodes.

17. A network node having a controller and an internal clock for time synchronization in a communication network; wherein the network node is configured to:
determine an estimated reference clock time discretely upon arrival of a synchronization message;
configure the controller to determine a controlled time comprising a time-continuous estimate of the discretely estimated reference clock time based on an input extrapolated to an execution time instant of the controller, the extrapolation being performed based on a slope of the estimated reference clock time and a slope of the controlled time with respect to an internal clock time of the at least one network node, and the execution time instant being separated from an arrival time instant of the synchronization message by a delay ($\Delta$tdelay);
determine the input as an offset between the discretely estimated reference clock time and the controlled time, extrapolated to said execution time instant; and
communicate sequentially with other nodes.

18. A computer program product executing on a processor which, when used on a non-transitory computer readable media having computer readable program code embodied therein which, when used on a computer apparatus, causes the processor to perform time synchronization in a communication network, the computer program comprising:
program code for configuring, for at least one network node, a controller for determining a controlled time comprising a time-continuous estimate of a discretely estimated reference clock time based on an input extrapolated to an execution time instant of the controller, the extrapolation being performed based on a slope of the estimated reference clock time and a slope of the controlled time with respect to an internal clock time of the at least one network node, and the execution time instant being separated from an arrival time instant of a synchronization message by a delay ($\Delta t_{delay}$);

program code for determining the input as an offset between the discretely estimated reference clock time and the controlled time, extrapolated to said execution time instant; and program code for communicating sequentially with other nodes.

* * * * *